United States Patent
Bacha

(10) Patent No.: US 11,042,601 B2
(45) Date of Patent: Jun. 22, 2021

(54) METHOD FOR ATTRACTING USERS TO A WEB PAGE AND SERVER IMPLEMENTING THE METHOD

(71) Applicant: OVH, Roubaix (FR)

(72) Inventor: Remi Bacha, La Madeleine (FR)

(73) Assignee: OVH, Roubaix (FR)

( * ) Notice: Subject to any disclaimer, the term of this patent is extended or adjusted under 35 U.S.C. 154(b) by 245 days.

(21) Appl. No.: 16/244,494

(22) Filed: Jan. 10, 2019

(65) Prior Publication Data
US 2020/0159803 A1 May 21, 2020

(30) Foreign Application Priority Data
Nov. 15, 2018 (EP) .................................... 18315042

(51) Int. Cl.
G06F 16/90 (2019.01)
G06F 16/957 (2019.01)
G06F 16/9538 (2019.01)
G06F 16/908 (2019.01)
G06F 16/958 (2019.01)

(52) U.S. Cl.
CPC ........ G06F 16/9577 (2019.01); G06F 16/908 (2019.01); G06F 16/958 (2019.01); G06F 16/9538 (2019.01)

(58) Field of Classification Search
None
See application file for complete search history.

(56) References Cited

U.S. PATENT DOCUMENTS

| | | |
|---|---|---|
| 6,370,582 B1 | 4/2002 | Lim et al. |
| 6,633,906 B1 | 10/2003 | Callaway et al. |
| 6,968,370 B2 | 11/2005 | Wu |
| 7,693,813 B1 | 4/2010 | Cao et al. |
| 8,849,812 B1 | 9/2014 | Mukherjee et al. |
| 9,262,145 B2 | 2/2016 | Grimme et al. |

(Continued)

FOREIGN PATENT DOCUMENTS

| | | |
|---|---|---|
| JP | H06266666 A | 9/1994 |
| WO | 2002/033553 A1 | 4/2002 |

OTHER PUBLICATIONS

English Abstract for JPH06266666 retrieved on Espacenet on Jul. 19, 2019.

(Continued)

*Primary Examiner* — Belix M Ortiz Ditren
(74) *Attorney, Agent, or Firm* — BCF LLP

(57) ABSTRACT

A method for attracting users to a web page is disclosed. A list of keywords relevant to the web page is defined at an operator interface. Each keyword of the list of keywords is independently submitted to a search engine. A result page is received for each keyword. A plurality of information elements is extracted from each result page. A score is calculated for each keyword based on the plurality of information elements extracted from each result page. At least one most attractive keyword is selected from the list of keywords, the selection being based on at least one best score among the scores for the keywords of the list. The at least one most attractive keyword is output on the operator interface as a recommendation for updating the web page to include the at least one most attractive keyword. A server implementing the method is also disclosed.

19 Claims, 8 Drawing Sheets

(56) References Cited

U.S. PATENT DOCUMENTS

| | | | |
|---|---|---|---|
| 9,589,053 | B1 | 3/2017 | Augustine et al. |
| 9,792,629 | B2 | 10/2017 | Rao et al. |
| 10,089,387 | B1 | 10/2018 | Hoyne et al. |
| 10,685,044 | B2 | 6/2020 | Miranda et al. |
| 2003/0018539 | A1 | 1/2003 | La Poutre et al. |
| 2004/0236737 | A1 | 11/2004 | Weissman et al. |
| 2005/0278723 | A1 | 12/2005 | Feinleib et al. |
| 2008/0196043 | A1 | 8/2008 | Feinleib et al. |
| 2009/0204910 | A1 | 8/2009 | Zhang |
| 2009/0299998 | A1 | 12/2009 | Kim |
| 2010/0281173 | A1 | 11/2010 | Vutukuri et al. |
| 2012/0185466 | A1* | 7/2012 | Yamasaki ........... G06F 16/3338 707/722 |
| 2014/0012841 | A1 | 1/2014 | Will et al. |
| 2014/0082602 | A1 | 3/2014 | Mallur et al. |
| 2016/0026720 | A1 | 1/2016 | Lehrer et al. |

OTHER PUBLICATIONS

"PowerShell Server", Software, retrieved on https://www.nsoftware.com/powershell/server/ on Mar. 16, 2018, 6 pages.

Qasha, "Developing Multi-platform package for Remote System Administration", (IJCSIS) International Journal of Computer Science and Information Security, vol. 10, No. 3, 2012, pp. 72-76.

Snover, "PowerShell is open sourced and is available on Linux", retrieved on https://azure.microsoft.com/en-us on Mar. 16, 2018, 6 pages.

"How can I connect to a Windows server using a Command Line Interface? (CLI)", ServerFault, retrieved on https://serverfault.com/questions/429426/how-can-i-connect-to-a-windows-server-using-a-command-line-interface-cli on Juy 19, 2019, 6 pages.

"Running PowerShell commands from Linux", Aaron's Code Notes, retrieved on http://sharpcodenotes.blogspot.com/2014/01/running-powershell-commands-from-linux.html on Juy 19, 2019, 2 pages.

Yunus, "Executing Powershell script on Win2012 R2 Server from Linux using SaltStack", retrieved on https://www.youtube.com/watch?v=miK25mDV9ik&feature=youtu.be on Juy 19, 2019, 1 page.

Schwartz, "Google reaffirms 15% of searches are new, never been searched before", 2017, https://searchengineland.com/google-reaffirms-15-searches-new-never-searched-273786, pdf document, 4 pages.

Dick "Search engine optimisation in UK news production", Journalism Practice, 2011, vol. 5, No. 4, pp. 462-477.

Giomelakis et al., "Employing search engine optimization techniques in online news articles. Studies in Media and Communication", 2015, vol. 3, No. 1, pp. 22-33.

Giomelakis et al., "Investigating search engine optimization factors in media websites: the case of Greece", Digital Journalism, 2016, vol. 4, No. 3, pp. 379-400.

Codina et al., "Search engine optimization and online journalism: the SEO-WCP framework", 2016, 21 pages.

Office Action with regard to the counterpart U.S. Appl. No. 16/030,445 dated Jun. 29, 2020.

Notice of Allowance with regard to the counterpart U.S. Appl. No. 16/030,445 dated Oct. 15, 2020.

* cited by examiner

METHOD FOR ATTRACTING USERS TO A WEB PAGE AND SERVER IMPLEMENTING THE METHOD

CROSS-REFERENCE

The present application claims priority to European Patent Application No. 18315042.4, filed on Nov. 15, 2018, the entirety of each of which is incorporated herein by reference.

FIELD

The present technology relates to the field of Internet searches. In particular, the present technology introduces a method for attracting users to a web page and to a server implementing the method.

BACKGROUND

Search engines such as Google™, Bing™, Yahoo!™ and the like assign ranks to search request results and the owner of a web site will normally desire his/her web site to have the highest possible ranking. Search engine optimization (SEO) is a technique used to augment the visibility of a web site to users of search engines. SEO allows a web site to obtain high ranks in search results, in turn increasing the traffic generated on the web site with the ultimate goal of increasing revenues for the web site owner.

Proper optimization using SEO requires a lot of attention to the content of a web site. Preparing a sound content strategy for a web site is a time-consuming task, usually requiring several days of work for a single site. This task may involve studying large numbers of search requests made by users, obtaining and postprocessing (e.g. cleaning) data from these search requests in order to populate the web site with keywords and other specific terms that are commonly used by users when specifying their search requests. A fundamental and concrete problem with manual preparation of a content strategy lies in the high rate of change of information in Internet web sites and of their referencing in search engines. For example, Google™ has recently stated that 15% of searches done on a daily basis have never been seen before ("Google reaffirms 15% of searches are new, never been searched before; Barry Schwartz on Apr. 25, 2017 at 10:47 am, Search Engine Land). Information stored on web sites worldwide changes everyday. Search engines routinely scan through web sites all over the world on a continuous basis, using a process called web crawling. New web sites and new web pages are repetitively visited by web crawlers on a daily basis and new or modified keywords are constantly added in the databases of search engines. Web site owners using a manual approach to define their content strategy based on a collection of keywords are constantly running late and cannot possibly keep up with new keywords added everyday.

Some Internet contents change at a very rapid pace. Non-limiting examples of information that may change within days, hours or even minutes, include contents of News sites. Sport results, results from awards shows, current information about political events, about passing of movie stars, or about catastrophes such as tsunamis or earthquakes, and the like, attract large amounts of Internet users desiring to obtain the latest, most of to date information. Users desiring to access the latest information about, for example, the 2018 World Cup will simply enter '2018 World Cup' as a query on a search engine that will respond with search engine result pages (SERP). Most users will not peruse beyond the first result page. A news organization desiring to attract users to a page about the 2018 World Cup on its web site needs to be found on that first result page.

Current SEO strategies do not allow a web designer to efficiently understand the intents of Internet users that are hidden behind their search queries and do not allow to automatically evaluate the likelihood that a particular content may become a hot news item.

Even though the recent developments identified above may provide benefits, improvements are still desirable.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

Embodiments of the present technology have been developed based on developers' appreciation of shortcomings associated with the prior art.

In particular, such shortcomings may comprise the lack of search engine optimization (SEO) techniques able to follow the very rapid pace of change of news-related information on the Internet and allowing a web designer to understand the intents behind search queries by Internet users.

In one aspect, various implementations of the present technology provide a method for attracting users to a web page, comprising:
  defining, at an operator interface of a server for the web page, a list of keywords relevant to the web page;
  for each keyword of the list of keywords:
    submitting, by the server, the keyword to a search engine,
    receiving, at the server, a result page from the search engine,
    extracting, at the server, a plurality of information elements from the result page, and
    calculating, at the server, a score for the keyword based on the plurality of information elements extracted from the result page;
  selecting, at the server, at least one most attractive keyword from the list of keywords, the selection being based on at least one best score among the scores for the keywords of the list; and
  outputting, on the operator interface of the server, the at least one most attractive keyword as a recommendation for updating the web page to include the at least one most attractive keyword.

In some implementations of the present technology, the method further comprises sorting the keywords according to their respective scores before selecting the at least one most attractive keyword.

In some implementations of the present technology, extracting the plurality of information elements from a given result page for a given keyword of the list of keywords comprises extracting at least a subset of the plurality of information elements from metadata of the given result page.

In some implementations of the present technology, the plurality of information elements extracted from a given result page comprises a plurality of tabs providing access to a corresponding plurality of search result types.

In some implementations of the present technology, the method further comprises:
  populating a days field if the plurality of information elements comprises a number of days in relation to a result shown on the given result page;
  populating an hours field if the plurality of information elements comprises a number of hours in relation to a result shown on the given result page; and
  populating a minutes field if the plurality of information elements comprises a number of minutes in relation to a result shown on the given result page.

In some implementations of the present technology, calculating the score for the given keyword comprises:
  allocating first points based on an order of the plurality of tabs on the given result page for the given keyword;
  allocating second points based on a freshness of the results on the given result page, the freshness being calculated based on content of one or more of the days field, the hours field and the minutes field;
  allocating third points if the given result page for the given keyword includes a top stories content; and
  adding the first points, the second points and the third points to calculate the score.

In some implementations of the present technology, allocating the first points comprises:
  allocating a maximum number of the first points if a news tab is first in the order of the plurality of tabs; and
  allocating less than the maximum number of the first points if the news tab is not first in the order of the plurality of tabs.

In some implementations of the present technology, allocating the second points comprises one of more of:
  allocating a minimum number of the second points if the freshness of the results is calculated based at least in part on the days field;
  allocating a medium number of the second points greater than the minimum number of the second points if the freshness of the results is calculated based at least in part on the hours field;
  allocating a maximum number of the second points greater than the medium number of the second points if the freshness of the results is calculated based at least in part on the minutes field; and
  summing the allocated second points.

In some implementations of the present technology, calculating the score for a given keyword of the list of keywords comprises assigning distinct weights to distinct information element types for calculating the score.

In other aspects, various implementations of the present technology provide server, comprising:
  a communication module configured for communicating with other network nodes over the Internet;
  an operator interface;
  a memory device; and
  a processor operatively connected to the communication module, to the operator interface, and to the memory device, the processor being configured for:
    receiving, via the operator interface, a list of keywords relevant to the web page,
    storing, in the memory device, the list of keywords relevant to the web page,
    causing the communication module to separately send each keyword of the list of keywords toward a search engine,
    receiving, from the search engine via the communication module, a result page for each keyword of the list of keywords,
    extracting a plurality of information elements from each result page,
    calculating a score for each keyword based on the plurality of information elements extracted from each corresponding result page,
    selecting at least one most attractive keyword from the list of keywords, the selection being based on a at least one best score among the scores for the keywords of the list, and
    causing the operator interface to output the at least one most attractive keyword as a recommendation for updating the web page to include the at least attractive one keyword.

In some implementations of the present technology, the processor is further configured for causing the memory device to store the plurality of information elements from a given result page for a given keyword of the list of keywords.

In some implementations of the present technology, the processor is further configured for:
  storing, in the memory device, one or more of a days field, an hours field and a minutes field extracted from the plurality of information elements of the given result page;
  storing, in the memory device, a plurality of tabs extracted from the plurality of information elements, the plurality of tabs providing access to a corresponding plurality of search result types;
  storing, in the memory device, at least a part of a top stories content extracted from the plurality of information elements; and
  calculating the score for the given keyword based on contents of at least one of the days field, the hours field, the minutes field, the plurality of tabs and the part of the top stories content.

In some implementations of the present technology, the processor is further configured for causing the operator interface to display a representation of the score for each keyword.

In some implementations of the present technology, the processor is further configured for automatically inserting the at least one most attractive keyword in metadata for the web page.

In other aspects, various implementations of the present technology provide a server, comprising:
  a communication module configured for communicating with a search engine over the Internet;
  an operator interface;
  a processor operatively connected to the communication module and to the operator interface; and
  a memory device, the memory device being configured for storing a list of keywords relevant to a web page, the memory device further comprising a non-transitory computer-readable medium storing executable code thereon, the executable code comprising instructions for executing, when the executable code runs on the processor, a method for attracting users to the web page, the method comprising:
    defining, at the operator interface, a list of keywords relevant to the web page;
    for each keyword of the list of keywords:
      submitting, by the server, the keyword to the search engine,
      receiving, at the server, a result page from the search engine,
      extracting, at the server, a plurality of information elements from the result page, and calculating, at the server, a score for the keyword based on the plurality of information elements extracted from the result page;

selecting, at the server, at least one most attractive keyword from the list of keywords, the selection being based on at least one best score among the scores for the keywords of the list; and outputting, on the operator interface, the at least one most attractive keyword as a recommendation for updating the web page to include the at least one most attractive keyword.

In the context of the present specification, unless expressly provided otherwise, a computer system may refer, but is not limited to, an 'electronic device', an 'operation system', a 'system', a 'computer-based system', a 'controller unit', a 'monitoring device', a 'control device' and/or any combination thereof appropriate to the relevant task at hand.

In the context of the present specification, unless expressly provided otherwise, the expression 'computer-readable medium', 'memory' and 'memory device' are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives. Still in the context of the present specification, 'a' computer-readable medium and 'the' computer-readable medium should not be construed as being the same computer-readable medium. To the contrary, and whenever appropriate, 'a' computer-readable medium and 'the' computer-readable medium may also be construed as a first computer-readable medium and a second computer-readable medium.

In the context of the present specification, unless expressly provided otherwise, the words 'first', 'second', 'third', etc. have been used as adjectives only for the purpose of allowing for distinction between the nouns that they modify from one another, and not for the purpose of describing any particular relationship between those nouns.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIGS. 2a and 2b reproduce a content of a first search engine result page (SERP) for another search query;

Figure 1A:
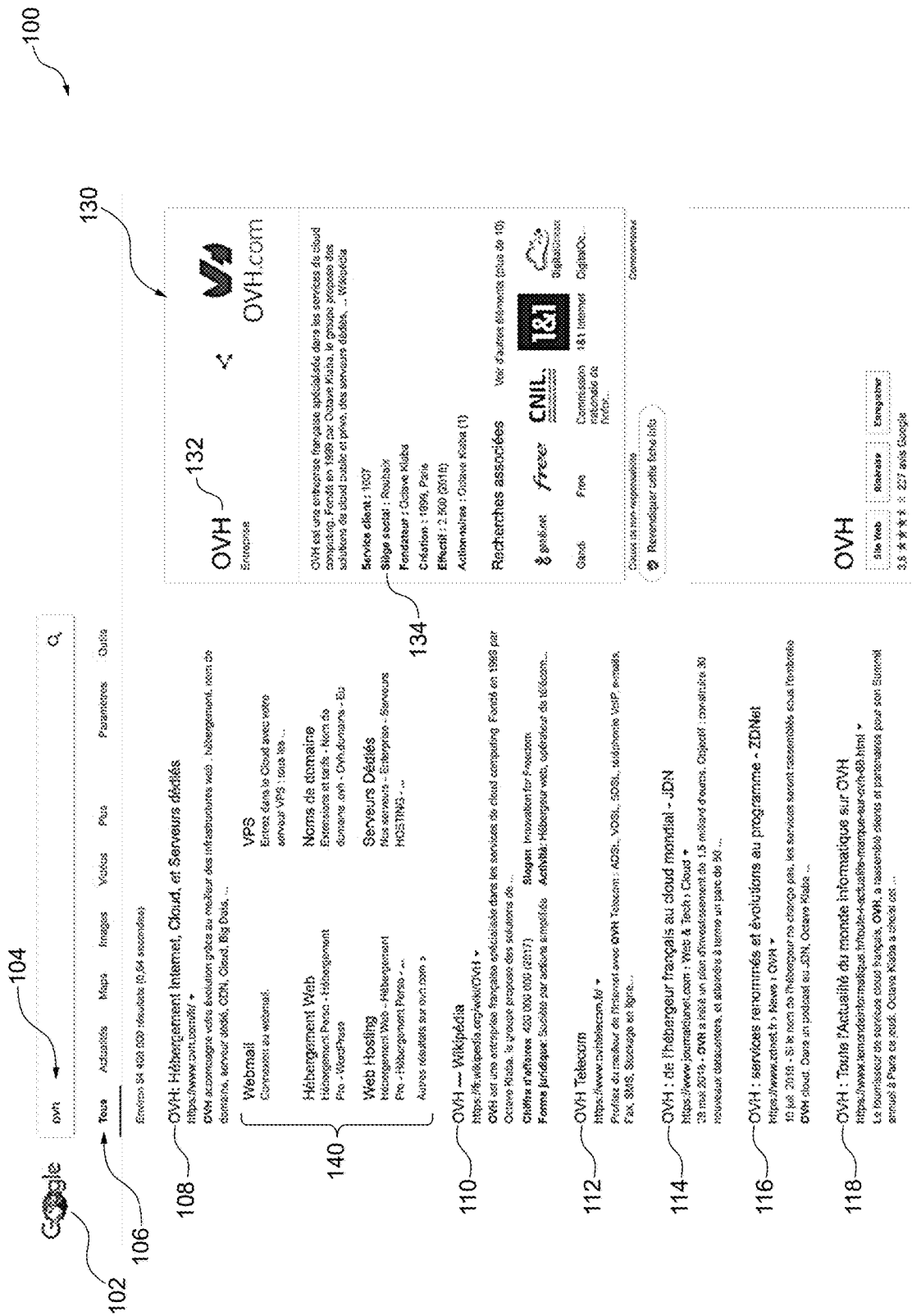
FIGS. 1a and 1b reproduce a content of a first search engine result page (SERP) for a search query.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in non-transitory computer-readable media and so executed by a computer or processor, whether or not such computer or processor is explicitly shown.

The functions of the various elements shown in the figures, including any functional block labeled as a 'processor', may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). Moreover, explicit use of the term a 'processor' should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

For clarity purposes, the present disclosure uses the terms 'user' and 'Internet user', both in singular and plural forms, to refer to generic users of search engines attempting to find links to web pages of interest. The term 'operator' refers to the persons in charge of defining, modifying, adding and/or deleting contents of a web page, an operator being also called a web designer.

In an aspect, the present technology introduces a method for attracting users to a web page of interest. An operator in charge of the web page of interest and desiring to attract users may use this method to acquire some understanding of the intent of users who submit queries to a search engine. To this end, information is acquired from search result pages (SERP) obtained from a search engine, for example and without limitation Google™. This information is acquired by submitting a list of keywords relevant to the web page of interest and defined by the operator. Each keyword of the list of keywords is independently submitted to the search engine. A SERP is received for each keyword. Various information elements are extracted from each result page and used to calculate a score specific to each keyword. They keywords are ranked according to their score. One or more keyword having the highest likelihood of attracting Internet traffic is selected based these scores. These one or more most attractive keywords are output on an operator interface as a recommendation to the operator for updating the web page of interest to include these most attractive keywords. In an embodiment, the scores are intimately lined to recent events related to the one or more keywords and the scores may be understood as news scores.

By suggesting the inclusion on the web page of interest of one or more most attractive keywords, the present technology helps the search engine optimization (SEO) process of the operator at least because the inclusion, by the operator, of the most attractive keywords on the web page of interest is expected to increase the likelihood that the search engine will show the web page of interest near the top of its search results when these keywords are entered in search queries submitted by Internet users.

With these fundamentals in place, we will now consider some non-limiting examples to illustrate various implementations of aspects of the present technology.

The following description and some of the drawings will make reference to the Google search engine. The present technology is not limited to this specific search engine; search result pages from other products, for example and without limitation search engines from Bing™, Yahoo™, Ask.com™, AOL.com™, and the like, also provide information that may be used by the present technology.

Some search engines such as Baidu™ and Yandex™ provide their results in languages that do not use the Latin alphabet; the present technology may be adapted to operate with Asian characters or with Cyrillic script.

Figure 1B:

FIGS. 1a and 1b reproduce a content of a first search engine result page (SERP) for a search query. The search query was 'ovh'. The SERP shown on FIGS. 1a and 1b, from top to bottom, was obtained on Oct. 30, 2018 using the Google search engine, by entering the following uniform resource locator (URL) in the address field of an Internet Explorer™ browser: https://google.fr/search?q=ovh.

Figure 2A:
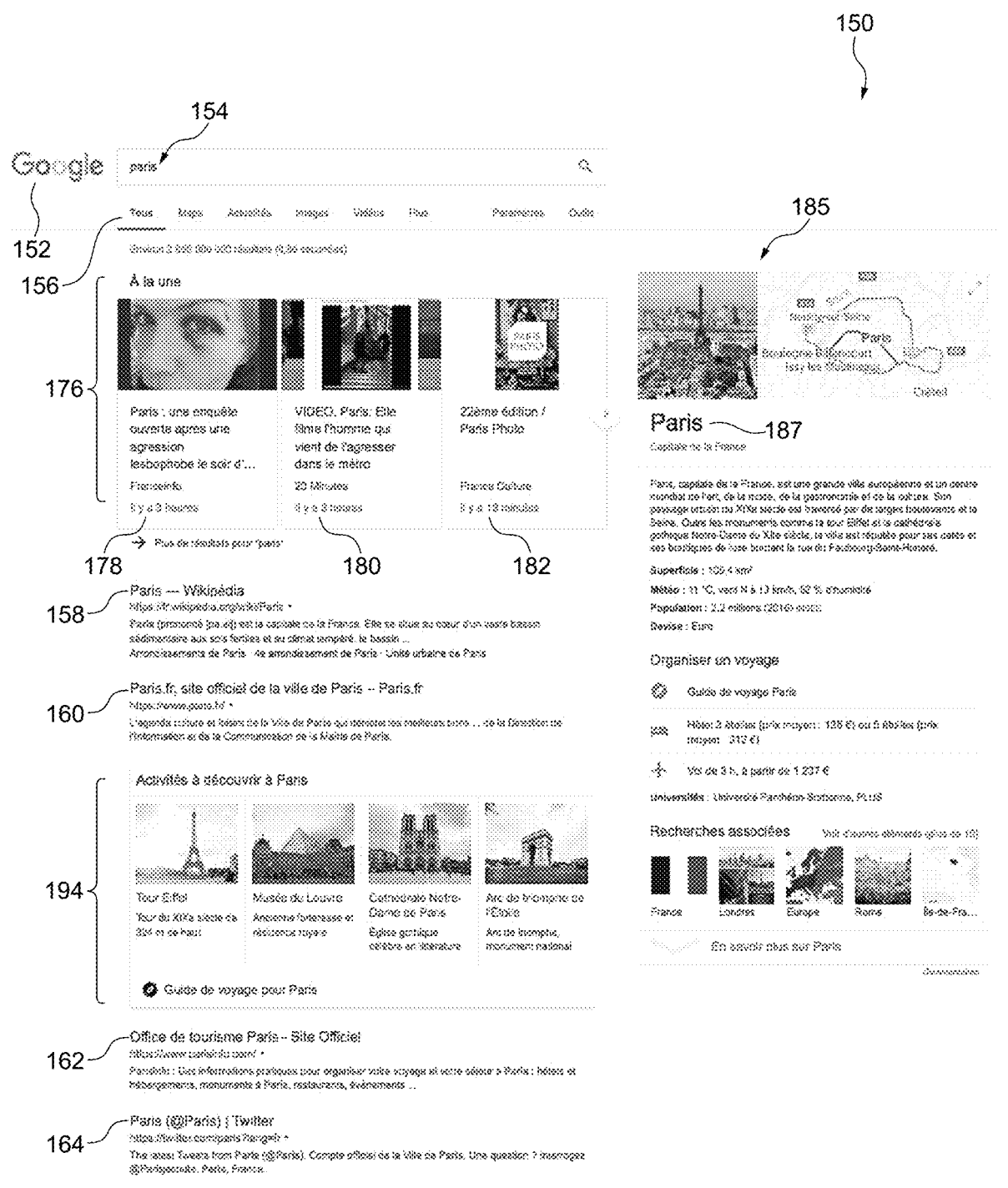
Figure 2B:
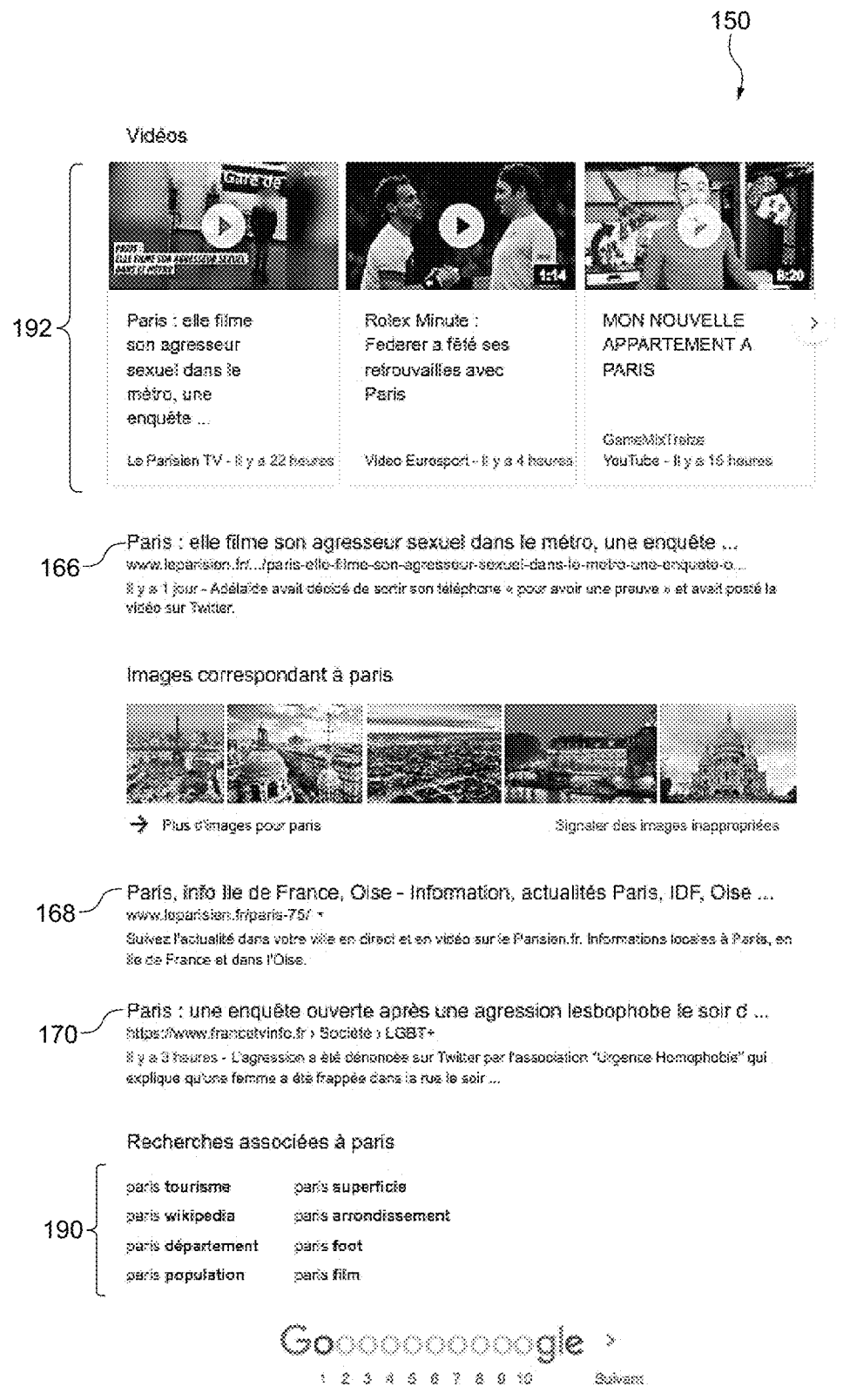

FIGS. 2a and 2b reproduce a content of a first search engine result page (SERP) for another search query. The search query was 'paris'. The SERP shown on FIGS. 2a and 2b, from top to bottom, was obtained on Nov. 2, 2018 using the Google search engine, by entering the following uniform resource locator (URL) in the address field of an Internet Explorer™ browser: https://google.fr/search?q=paris.

Table I shows, in a first column, names of parameters that are extracted from the SERPs of FIGS. 1a, 1b, 2a and 2b. A second column provides values that have been extracted from the SERP illustrated on FIGS. 1a and 1b. A third column provides values that have been extracted from the SERP illustrated on FIGS. 2a and 2b. In an embodiment, populating Table I stops after listing the values appearing on the first result page; the reason for this is that the operator using the present technology may desire to increase chances that a link to the web page of interest will appear on that first page.

Several of the values in the second and third columns of Table I are expressed in French, given that the search term is related to a French company and a French city. This does not limit the generality of the present disclosure.

TABLE I

| Parameter | Value (from FIGS. 1a and 1b) |
| --- | --- |
| query | ovh |
| serp_url | https://google.fr/search?q=ovh |
| tabs | Tous Actualités Maps Images Vidéos |
| tab_1 | Actualites |
| tab_2 | Maps |
| tab_3 | Images |
| tab_4 | Vidéos |
| tab_5 | Shopping |
| g_adwords | 0 |
| g_shopping | 0 |
| Fresh_results | 3 |
| Fresh_results_d | 3 |
| Fresh_results_h | 0 |
| Fresh_results_m | 0 |
| Knowledge_Graph | KnoweldgeGraph |

TABLE I-continued

| | |
|---|---|
| | OVHEntreprise |
| Feature_snippet_text | N/A |
| Feature_snippet_list | N/A |
| Feature_snippet_table | N/A |
| Google_Onebox_direct_answer | N/A |
| Google_Onebox_weather | N/A |
| Google_Onebox_calculator | N/A |
| Google_Onebox_translator | N/A |
| Google_Onebox_sport | N/A |
| Google_Onebox_hour | N/A |
| Google_Onebox_convers | N/A |
| Rich_Snippets_rating | 0 |
| Rich_Snippets_time | 0 |
| Rich_Snippets_price | 0 |
| Wikipedia | 1 |
| Youtube | 0 |
| paa_1 | N/A |
| paa_2 | N/A |
| paa_3 | N/A |
| paa_3 | N/A |
| video_1 | N/A |
| video_2 | N/A |
| video_3 | N/A |
| video_4 | N/A |
| video_5 | N/A |
| video_6 | N/A |
| video_7 | N/A |
| video_8 | N/A |
| video_9 | N/A |
| video_10 | N/A |
| actu_1 | N/A |
| actu_2 | N/A |
| actu_3 | N/A |
| actu_4 | N/A |
| actu_5 | N/A |
| actu_6 | N/A |
| actu_7 | N/A |
| actu_8 | N/A |
| actu_9 | N/A |
| actu_10 | N/A |
| local_pack_MyBusiness_1 | N/A |
| local_pack_MyBusiness_2 | N/A |
| local_pack_MyBusiness_3 | N/A |
| site_links_1 | Webmail |
| site_links_2 | VPS |
| site_links_3 | Hébergement Web |
| site_links_4 | Noms de domaine |
| site_links_5 | Web Hosting |
| site_links_6 | Serveurs Dédiés |
| title_1 | OVH: Hébergement Internet, Cloud, et Serveurs dédiés |
| titled | OVH - Wikipédia |
| title_3 | OVH Telecom |
| title_4 | OVH: de l'hébergeur français au cloud mondial - JDN |
| title_5 | OVH: services renommés et évolutions au programme . . . |
| title_6 | OVH: Toute l'Actualité du monde informatique sur OVH |
| title_7 | Michel Paulin mouille la chemise chez OVH- Les Echos . . . |
| title_8 | N/A |
| title_9 | N/A |
| title_10 | N/A |
| title_11 | N/A |
| title_12 | N/A |
| title_13 | N/A |
| title_14 | N/A |
| title_15 | N/A |
| url_1 | https://www.ovh.com/ca/fr/ |
| url_2 | https://fr.wikipedia.org/wiki/OVH |
| url_3 | https://www.ovhtelecorn.fr/ |
| url_4 | https://www.journaldunet.com > Web & Tech > Cloud |

TABLE I-continued

| | |
|---|---|
| url_5 | https://www.zdnet.fr > News > OVH |
| url_6 | https://www.lemondeinformatique.fr/toute-t-actualite . . . |
| url_7 | https ://www.lesechos.fr > Tech - Médias > High tech |
| url_8 | N/A |
| url_9 | N/A |
| url_10 | N/A |
| url_11 | N/A |
| url_12 | N/A |
| url_13 | N/A |
| url_14 | N/A |
| url_15 | N/A |
| related_search_1 | ovh telephone |
| related_search_2 | ovh roubaix |
| related_search_3 | ovh hebergement |
| related_search_4 | ovh panne |
| related_search_5 | ovh telecom |
| related_search_6 | ovh connexion |
| related_search_7 | ovh mail |
| related_search_8 | ovh recrutement |
| entity | OVH |
| entity_type | Entreprise |
| entity_type_mybusiness | Siège social |
| query_type | N/A |
| Score | 34 |

| Parameter | Value (from FIGS. 2a and 2b) |
|---|---|
| query | pans |
| serp_url | https://www.google.fr/search?q=paris |
| tabs | Tous Maps Actualités Images Videos |
| tab_1 | Maps |
| tab_2 | Actualites |
| tab_3 | Images |
| tab_4 | Vidéos |
| tab_5 | Shopping |
| g_adwords | 0 |
| g_shopping | 0 |
| Fresh_results | 5 |
| Fresh_results_d | 1 |
| Fresh_results_h | 3 |
| Fresh_results_m | 1 |
| Knowledge_Graph | Knowledge Graph ParisCapitale de la France |
| Feature_snippet_text | N/A |
| Feature_snippet_list | N/A |
| Feature_snippet_table | N/A |
| Google_Onebox_direct_answer | N/A |
| Google_Onebox_weather | N/A |
| Google_Onebox_calculator | N/A |
| Google_Onebox_translator | N/A |
| Google_Onebox_sport | N/A |
| Google_Onebox_hour | N/A |
| Google_Onebox_convers | N/A |
| Rich_Snippets_rating | 0 |
| Rich_Snippets_time | 0 |
| Rich_Snippets_price | 0 |
| Wikipedia | 1 |
| Youtube | 0 |
| paa_1 | N/A |
| paa_2 | N/A |
| paa_3 | N/A |
| paa_3 | N/A |
| video_1 | Paris: elle filme son agresseur sexuel dans le métro, une enquête . . . |
| video_2 | Rolex Minute: Federer a fêté ses retrouvailles avec Paris |

TABLE I-continued

| | |
|---|---|
| video_3 | MON NOUVELLE APPARTEMENT A PARIS |
| video_4 | N/A |
| video_5 | N/A |
| video_6 | N/A |
| video_7 | N/A |
| video_8 | N/A |
| video_9 | N/A |
| video_10 | N/A |
| actu_1 | "Paris: une enquête ouverte après une agression lesbophobe le soir |
| actu_2 | VIDEO. Paris: Elle filme l'homme qui vient de l'agresser dans le metro |
| actu_3 | "Ibrahim Maalouf va sortir Live in Paris, enregistré lors de son concert à |
| actu_4 | N/A |
| actu_5 | N/A |
| actu_6 | N/A |
| actu_7 | N/A |
| actu_8 | N/A |
| actu_9 | N/A |
| actu_10 | N/A |
| local_pack_MyBusiness_1 | N/A |
| local_pack_MyBusiness_2 | N/A |
| local_pack_MyBusiness_3 | N/A |
| site_links_1 | N/A |
| site_links_2 | N/A |
| site_links_3 | N/A |
| site_links_4 | N/A |
| site_links_5 | N/A |
| site_links_6 | N/A |
| title_1 | Paris -Wikipedia |
| titled | Paris.fr, site officiel de la ville de Paris - Paris.fr |
| title_3 | Office de tourisme Paris - Site Officiel |
| title_4 | Paris (@ Paris) \| Twitter |
| title_5 | Paris: elle filme son agresseur sexuel dans le métro, une enquête |
| title_6 | Paris, info Ile de France, Oise - Information, actualités Paris, IDF, Oise. . . |
| title_7 | Paris: une enquête ouverte après une agression lesbophobe le soir d. . . |
| title_8 | N/A |
| title_9 | N/A |
| title_10 | N/A |
| title_11 | N/A |
| title_12 | N/A |
| title_13 | N/A |
| title_14 | N/A |
| title_15 | N/A |
| url_1 | https://fr.wikipedia.org/wiki/Paris |
| url_2 | https://www.paris.fr/ |
| url_3 | https://www.parisinfo.com/ |
| url_4 | https://twitter.com/paris?lang=fr |
| url_5 | www.leparisien.fr/.../paris-elle-filme-son-agresseur-sexuel-dans-le-metro-une-enquete-o... |
| url_6 | www.leparisien.fr/paris-75/ |
| url_7 | https ://www.francetvinfo.fr > Société > LGBT+ |
| url_8 | N/A |
| url_9 | N/A |
| url_10 | N/A |
| url_11 | N/A |
| url_12 | N/A |
| url_13 | N/A |
| url_14 | N/A |

TABLE I-continued

| | |
|---|---|
| url_15 | N/A |
| related_search_1 | paris tourisme |
| related_search_2 | paris wikipedia |
| related_search_3 | paris departement |
| related_search_4 | paris population |
| related_search_5 | paris superficie |
| related_search_6 | paris arrondissement |
| related_search_7 | paris foot |
| related_search_8 | paris film |
| entity | Paris |
| entity_type | Capitale de la France |
| entity_type_mybusiness | N/A |
| query_type | N/A |
| Score | 88 |

| Parameter | Meaning |
|---|---|
| query | Term or terms entered on the search engine 'search' field |
| serp_url | Address of the SERP formed of the google.fr site with the search term listed on the above row |
| tabs | List and order to the tabs shown on the SERP |
| tab_1 | Value of the $1^{st}$ tab |
| tab_2 | Value of the $2^{nd}$ tab |
| tab_3 | Value of the $3^{rd}$ tab |
| tab_4 | Value of the $4^{th}$ tab |
| tab_5 | Value of the $5^{th}$ tab (in the present case, 'Shopping' is the first tab that appears in a drop down list when selecting the 'Plus' tab shown on FIGS. 1a or 2a) |
| g_adwords | Advertising content shown on the SERP |
| g_shopping | Links to the Google Shopping site |
| Fresh_results | Freshness ranking of the SERP calculated as a sum of the next three (3) parameter values |
| Fresh_results_d | Number of results on the SERP showing a date value |
| Fresh_results_h | Number results on the SERP showing a time in hours |
| Fresh_results_m | Number results on the SERP showing a time in minutes |
| Knowledge_Graph | Box appearing on the SERP that shows semantic data about the search query |
| Feature_snippet_text | Text extracted from a relevant link and appearing on the SERP |
| Feature_snippet_list | Formatting information about the feature snippet |
| Feature_snippet_table | As above |
| Google_Onebox_direct_answer | Box of the SERP that provides specific information related to the search query |
| Google_Onebox_weather | As above |
| Google_Onebox_calculator | As above |
| Google_Onebox_translator | As above |

TABLE I-continued

| | |
|---|---|
| Google_Onebox_sport | As above |
| Google_Onebox_hour | As above |
| Google_Onebox_convers | As above |
| Rich_Snippets_rating | Small amount of information shown on the SERP about the search query |
| Rich_Snippets_time | As above |
| Rich_Snippets_price | As above |
| Wikipedia | Presence of a link to a Wikipedia page |
| Youtube | Presence of a link to a Youtube page |
| paa_1 | 'People also asked' content |
| paa_2 | As above |
| paa_3 | As above |
| paa_3 | As above |
| video_1 | Video content of the SERP |
| video_2 | As above |
| video_3 | As above |
| video_4 | As above |
| video_5 | As above |
| video_6 | As above |
| video_7 | As above |
| video_8 | As above |
| video_9 | As above |
| video_10 | As above |
| actu_1 | News content of the SERP |
| actu_2 | As above |
| actu_3 | As above |
| actu_4 | As above |
| actu_5 | As above |
| actu_6 | As above |
| actu_7 | As above |
| actu_8 | As above |
| actu_9 | As above |
| actu_10 | As above |
| local_pack_MyBusiness_1 | Information about a site related to the search query on Google's MyBusiness site |
| local_pack_MyBusiness_2 | As above |
| local_pack_MyBusiness_3 | As above |
| site_links_1 | Additional link appearing on the SERP underneath a main result link |
| site_links_2 | As above |
| site_links_3 | As above |
| site_links_4 | As above |
| site_links_5 | As above |
| site_links_6 | As above |
| title_1 | Title of a page appearing on the SERP |
| titled | As above |
| title_3 | As above |
| title_4 | As above |
| title_5 | As above |
| title_6 | As above |
| title_7 | As above |
| title_8 | As above |
| title_9 | As above |
| title_10 | As above |
| title_11 | As above |
| title_12 | As above |
| title_13 | As above |
| title_14 | As above |
| title_15 | As above |
| url_1 | Link (URL) to a page appearing on the SERP |
| url_2 | As above |
| url_3 | As above |
| url_4 | As above |
| url_5 | As above |
| url_6 | As above |
| url_7 | As above |
| url_8 | As above |

TABLE I-continued

| | |
|---|---|
| url_9 | As above |
| url_10 | As above |
| url_11 | As above |
| url_12 | As above |
| url_13 | As above |
| url_14 | As above |
| url_15 | As above |
| related_search_1 | Suggested queries for additional related searches |
| related_search_2 | As above |
| related_search_3 | As above |
| related_search_4 | As above |
| related_search_5 | As above |
| related_search_6 | As above |
| related_search_7 | As above |
| related_search_8 | As above |
| entity | Generic name of an entity featured on a web page for the search query |
| entity_type | Type for the entity |
| entity_type_mybusiness | As above |
| query_type | Field designating a type for the search query |
| Score | Calculated scores for the search terms (see below) |

In Table I, the 'Meaning' column is not actually part of the results obtained from the SERP. The 'Meaning' column is shown in the present disclosure for information purposes. In an implementation, the 'Value' columns of Table I may be repeated for a plurality of distinct search queries. The content of Table I is specific to SERPs obtained using Google. When using another search engine, many similar information elements may be obtained, although some of those information elements will be expressed using distinct names, distinct formats, or distinct languages (particularly in the case of Baidu or Yandex). Some parameters and values of Table I may not be available in SERPs obtained using other search engines; however many parameters used by the present technology are frequently made available by other search engines.

Some of the parameters and values shown on Table I and their relation to the content of FIGS. 1a and 1b will now be described. A SERP 100 shows a logo 102 of the search engine, in the present case 'Google', and a field 104 reproducing the search query, in the present case 'ovh'. This search query is reproduced at the top of Table I, in the second column, followed by the URL used to apply this search query to Google. A row 106 shows various result tabs that respectively read, in the present case 'Tous Actualités Maps Images Videos Plus' (equivalently 'All News Maps Images Videos More' for a Google SERP in English). The first of these tabs, 'Tous' (All), indicates that the SERP 100 and the following pages provide links to all Internet web pages found by the search engine. This 'All' tab does not provide any particular information related to the prevalence of content types related to the search query. The following tabs, however, provide an indication of the prevalence of content types for the search query. In the example of FIG. 1a, news content ('Actualités') comes first on the row 106 to indicate that news content is currently very prevalent among the Internet web pages found by the search engine. The prevalence of other content types is, in descending order, maps, images, videos, and various other content types (e.g. shopping, finance, books, flights) listed under the 'Plus' (More) tab. The tabs of row 106, other than the 'Tous' (All) tab and the 'Plus' (More) tab, are listed in the same order as tab_1 to tab_5 in Table I.

Seven (7) links to relevant Internet web pages are listed on the SERP, identified by links 108, 110, 112, 114, 116, 118, 120. Generally, the search engine lists these links in descending relevance order. The SERP indicates in a field 124 (FIG. 1b) that many more links are provided on further pages, still in descending relevance order. An embodiment of the present technology focuses on the first result page. The titles of these seven (7) links 108 to 120 are respectively reproduced as the title_1 to title_7 on Table I. Because the SERP only provides seven (7) links, entries for title_8 to title_15 are left empty, set to a null value or set to not available (N/A) as illustrated on Table I. Addresses of these seven (7) links 108 to 120 are reproduced as the url_1 to url_7 on Table I; url_8 to url_15 are left empty or set to N/A or any other null value.

Among the seven (7) links, links 114, 116 and 130 show publication dates. The Fresh_results_d for the SERP 100 is therefore set to three (3). None of the links show publication times in hours or minutes, so the Fresh_results_h and Fresh_results_m for the SERP 100 are both set to zero (0). The Fresh_results field, which is the sum of these values, is also set to three (3).

The SERP 100 includes a knowledge graph 130 (the knowledge graph 130 extends over FIGS. 1a and 1b). The knowledge graph provides a generic indication 132 'OVH Entreprise' of the nature of an entity found using the search query 104. This generic indication 132 is inserted in the Knowledge_Graph parameter value.

Other information elements of knowledge graph 130 are also copied into Table I. For example, the generic indication 132 'OVH Entreprise' is used to populate the entity and entity-type fields. The entity_type_mybusiness field is populated with the 'Siège social' value of a field 134.

Six (6) site links 140 are found underneath one of the links provided by the search engine, that is, under the link 108. Titles of these site link are inserted in the site_links_1 to site_links_6 fields of Table I.

A number of related search queries 142 that have recently been applied to the search engine by other users are listed at the bottom of the SERP 100 (FIG. 1b). These related search queries 142 are copied in the related_search_1 to related-search_8 of Table I.

Turning now the third column showing values in relation to the content of FIGS. 2a and 2b, a SERP 150 shows a logo 152 of the search engine, in the present case a different version of the 'Google' logo, and a field 154 reproducing the search query, in the present case 'paris'. This search query is reproduced at the top of Table I, in the third column, followed by the URL used to apply this search query to Google. A row 156 shows various result tabs that respectively read, in the present case 'Tous Maps Actualités Images Videos Plus' (equivalently 'All Maps News Images Videos More' for a Google SERP in English). The first of these tabs, 'Tous' (All), indicates that the SERP 150 and the following pages provide links to all Internet web pages found by the search engine. This 'All' tab does not provide any particular information related to the prevalence of content types related to the search query. The following tabs, however, provide an indication of the prevalence of content types for the search query. In the example of FIG. 1b, news content ('Actualités') comes second to Maps on the row 106 to indicate that news content is currently fairly prevalent among the Internet web pages found by the search engine, news content being however less prevalent than maps content. The prevalence of other content types is, in descending order, images, videos, and various other content types (e.g. shopping, finance, books, flights) listed under the 'Plus' (More) tab. The tabs of row 156, other than the 'Tous' (All) tab and the 'Plus' (More) tab, are listed in the same order as tab_1 to tab_5 in Table I.

Seven (7) links to relevant Internet web pages are listed on the SERP, identified by links 158, 160, 162, 164, 166, 168, 170. Generally, the search engine lists these links in descending relevance order. The titles of these seven (7) links 158 to 170 are respectively reproduced as the title_1 to title_7 on Table I. Addresses of these seven (7) links 158 to 170 are reproduced as the url_1 to url_7 on Table I; url_8 to url_15 are left empty or set to N/A or any other null value.

FIG. 2a shows that a 'À la une' box 176 (equivalently a 'Top Stories' box) that includes very fresh news content. Within the box 176, fields 178 and 180 show that news items were published 3 hours ago and a field 182 shows that another news item was published 19 minutes ago. The link 170 shows a publication time in hours and the link 166 shows a publication time in days, i.e. one (1) day ago. In Table I, these information elements are used to populate the 'Fresh_results_d' parameter value, which is set to one (1), the 'Fresh_results_h' parameter value, which is equal to three (3), and the 'Fresh_results_m' parameter value, which is set to 1. The 'Fresh_results' parameter value is a sum of these values, being set to five (5).

The SERP 150 includes a knowledge graph 185. The knowledge graph provides a generic indication 187 'Paris Capitale de France' of the nature of an entity found using the search query 154. This generic indication 187 is inserted in the Knowledge_Graph parameter value.

Other information elements of knowledge graph 187 are also copied into Table I. For example, the generic indication 187 'Paris Capitale de France' is used to populate the entity and entity-type fields.

A number of related search queries 190 that have recently been applied to the search engine by other users are listed at the bottom of the SERP 150 (FIG. 1b). These related search queries 190 are copied in the related_search_1 to related-search_8 of Table I.

FIG. 2b also shows three (3) linked videos 192. Titles of these videos are shown in the video_1 to video_3 fields of Table I. Image contents 194 are not reflected in Table I and not used in the present implementation.

Result pages obtained when entering other search queries on the same search engine, in this case Google, may have different structures. Some result pages may not contain a knowledge graph or a 'Top Stories' content. Some result pages include other content used to populate fields of Table I that are not part of the SERPs 100 and 150. Such fields may include one or more feature snippets, direct answers from Google, links to videos from Youtube™ or other sites, contents acquired from Wikipedia™, suggestions for other relevant searches identified with labels 'People also asked', news content, and the like.

When the same search queries, in the present case 'ovh' or 'paris', is applied to another search engine, a different SERP will generally show similar content, however presented in a different format, with more or less emphasis on certain results. For example, a SERP from Bing consistently shows result tabs in the same order, which is 'All Images Videos Maps News'. The present technology may be adapted to extract contents from any SERP obtained from any search engine. The person of ordinary skill in the art will be able to adapt the structure of Table I to insert information elements extracted from a SERP presented by any search engine.

Figure 3:
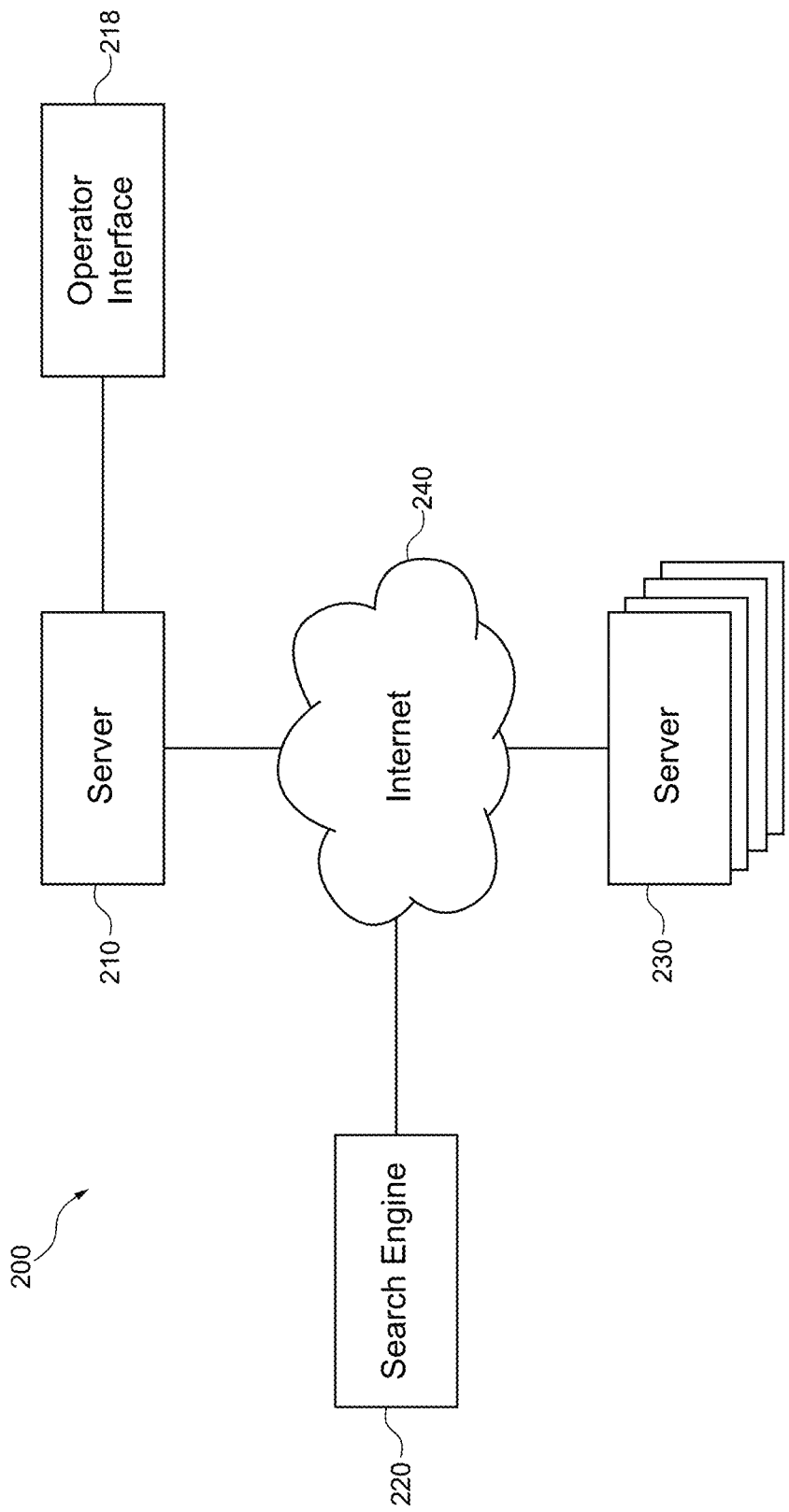
FIG. 3 illustrates a network in accordance with an embodiment of the present technology.

FIG. 3 illustrates a network in accordance with an embodiment of the present technology. A network 200 includes a server 210 for a web site operatively connected to an operator interface 218 including for example a computer display with a keyboard and a mouse, a touch sensitive display, and the like, allowing a web site owner to enter information into the server 210 and to receive information from the server 210. The network 200 also includes a search engine 220 and a plurality of Internet users 230, all of which are connected to the server 210 via the Internet 140. The network 200 may include a plurality of servers such as the server 210; however, the description of the present technology will focus on improvements made in the server 210 and on the needs of a particular web site implemented in the server 210. The network may include a plurality of search engines. A single search engine 220 is illustrated for simplicity purposes and without limiting the generality of the present technology.

Figure 4:
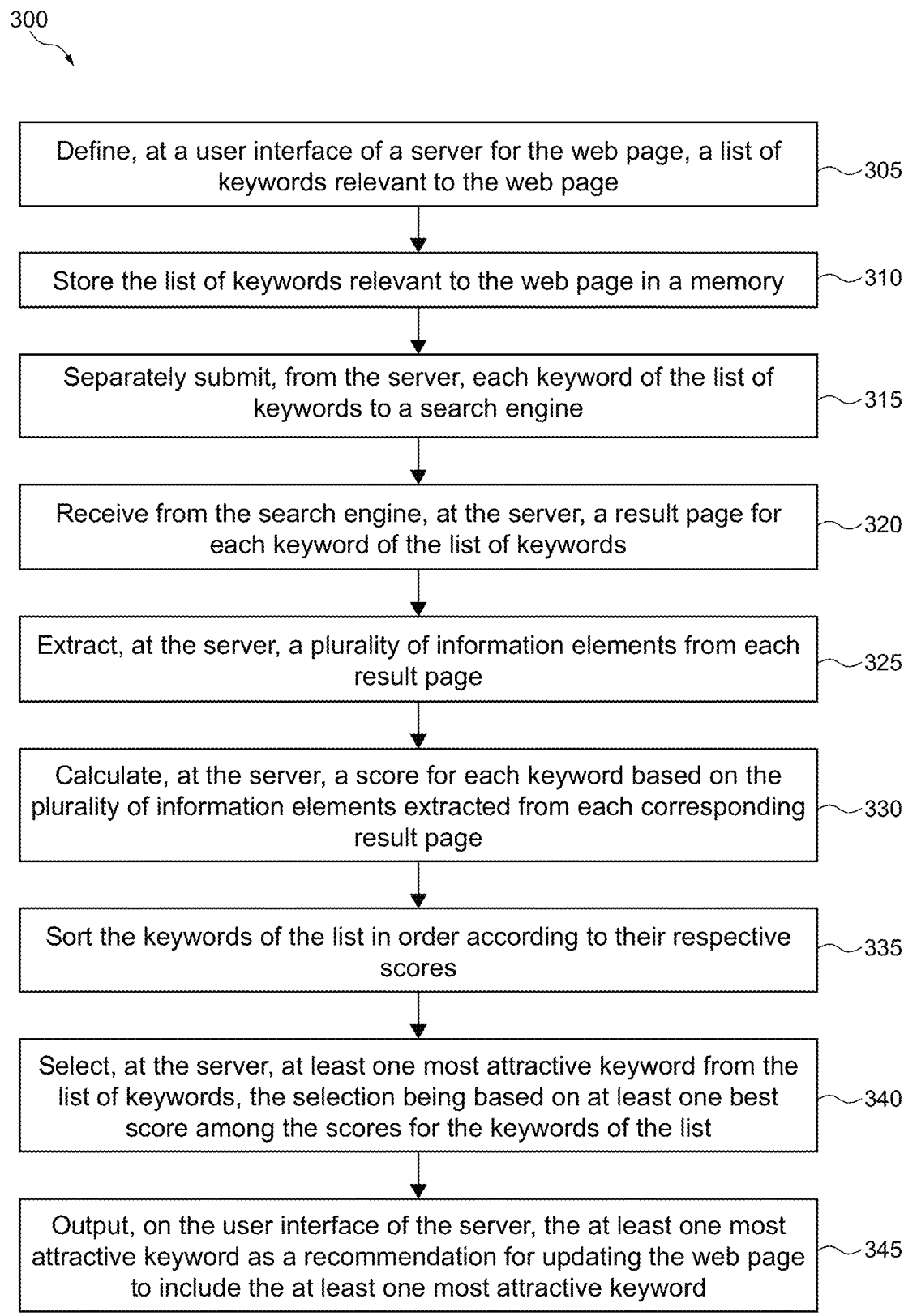
FIG. 4 is a sequence diagram showing operations of a method for attracting users to a web page in accordance with an embodiment of the present technology.

FIG. 4 is a sequence diagram showing operations of a method for attracting users to a web page in accordance with an embodiment of the present technology. On FIG. 4, a sequence 300 comprises a plurality of operations that may be executed in variable order, some of the operations possibly being executed concurrently, some of the operations being optional. At operation 305, a list of keywords relevant to the web page is defined at the operator interface 218 of the server 210 that serves the web page. The list of keywords relevant to the web page is stored in a memory by the server 210 at operation 310. Each keyword of the list of keywords is separately submitted by the server 210 to the search engine 220 at operation 315. At operation 320, the server 210 receives, from the search engine 220, a result page for each keyword of the list of keywords. The server 210 extracts a plurality of information elements from each result page at operation 325, for example all or some of the information elements as shown on Table I. In a variant, at least a subset of the information elements may be extracted from metadata of the search result page. At operation 330, the server calculates a score for each keyword based on the plurality of information elements extracted from each corresponding result page. The server may sort the keywords of the list in order according to their respective scores at operation 335. The server 210 then selects, at operation 340, at least one most attractive keyword from the list of keywords, the selection being based on at least one best score among the scores for the keywords of the list. At operation 345, the server 210 causes the operator interface 218 to display the at least one most attractive keyword as a recommendation for updating the web page to include the at least one most attractive keyword. In an embodiment, the server 210 may cause the operator interface 218 to display several or all of the keywords of the list of keywords, ranked in descending order of their scores. In this or another embodiment, the server 210 may also cause the operator interface 218 to display the scores for each of the displayed keywords.

Figure 5:
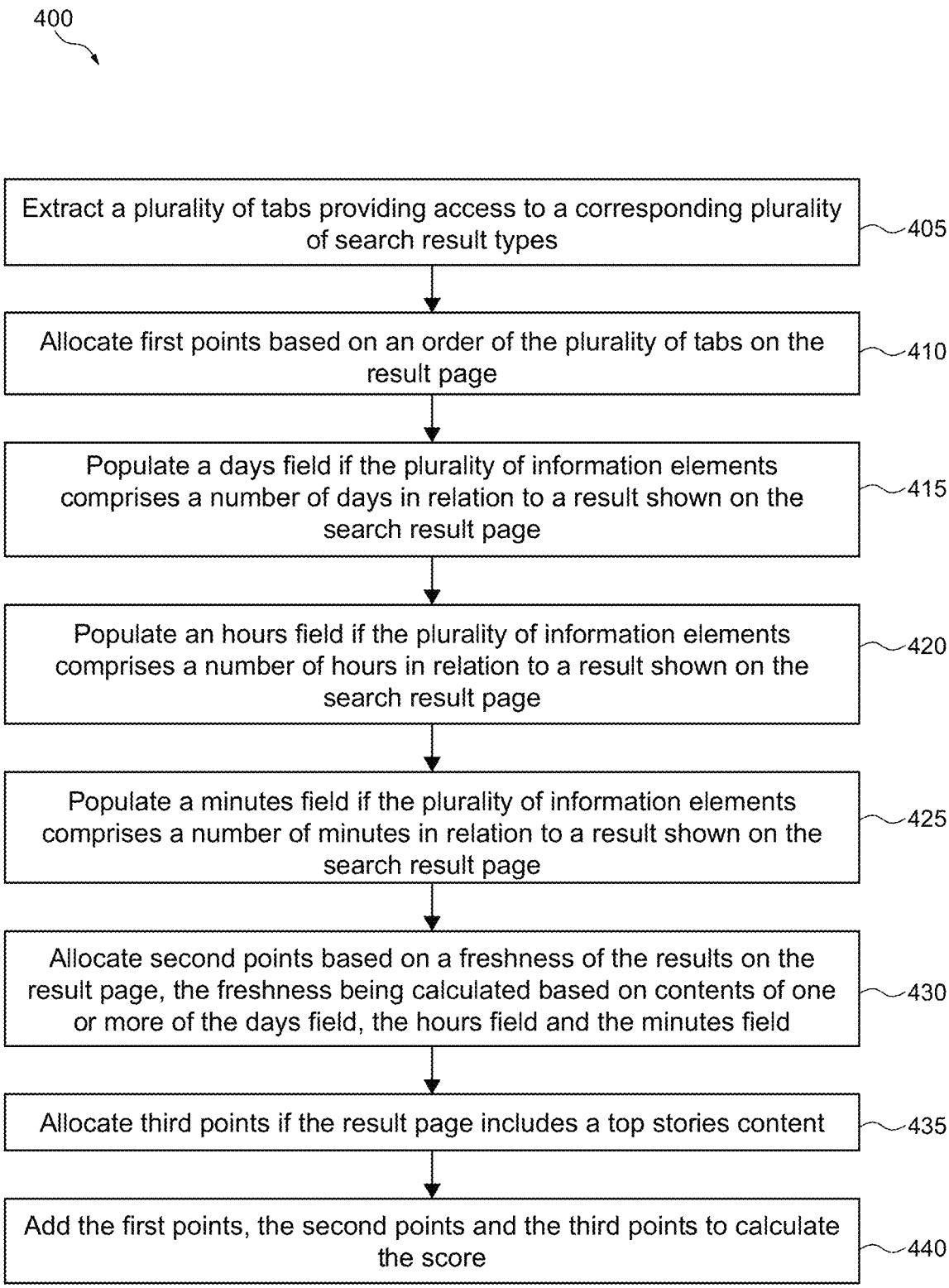
FIG. 5 is a sequence diagram showing operations of a method for calculating a score for a keyword in accordance with an embodiment of the present technology.

In the sequence 300, the server calculates a score for each keyword based on the plurality of information elements extracted from each corresponding result page at operation 330. Various manners of calculating the score may be contemplated, using selected ones of the information elements listed in Table I. For example, FIG. 5 is a sequence diagram showing operations of a method for calculating a score for a keyword in accordance with an embodiment of the present technology. On FIG. 5, a sequence 400 comprises a plurality of operations that may be executed in variable order, some of the operations possibly being executed concurrently, some of the operations being optional. The sequence 400 may be executed independently for each search result page received at the server 210 at operation 320, in response to corresponding search queries sent to the search engine 220 at operation 315.

At operation 405, the server 200 extracts, from the plurality of information elements extracted from a given result page for a given search query, a plurality of tabs providing access to a corresponding plurality of search result types. These tabs may for example be those shown on the row 106 of FIG. 1a. The server 200 populates the corresponding fields (tabs, tab_1 to tab_5) of Table I with these tabs. At operation 410, the server 210 allocates first points based on an order of the plurality of tabs on the result page for the given keyword. In a non-limiting example, a maximum of 10 points is allocated if the News field is in the first tab (tab_1). This maximum number of the first points, when allocated, is an indication that news content is currently very prevalent among the Internet web pages found by the search engine for the given search query. The first points are set to 5, 3, 2 or 1, respectively, when the News field is in the second, third, fourth or fifth tab on the row 106.

At operation 415, the server populates a days field (the Fresh_results_d field of Table I) if the plurality of information elements comprises a number of days in relation to a result shown on the search result page, for example in the Top Stories box 176 of the SERP 150. At operation 420, the server populates an hours field (the Fresh_results_h field of Table I) if the plurality of information elements comprises a number of hours in relation to a result shown on the search result page, for example in the Top Stories box 176 of the SERP 150. At operation 425 the server populates a minutes field (the Fresh_results_m field of Table I) if the plurality of information elements comprises a number of minutes in relation to a result shown on the search result page, for example in the Top Stories box 176 of the SERP 150.

At operation 430, the server allocates second points based on a freshness of the results on the result page, the freshness being calculated based on contents of one or more of the days field (the Fresh_results_d field of Table I), the hours field (the Fresh_results_h field of Table I) and the minutes field (the Fresh_results_m field of Table I). In an embodiment, a maximum number of the second points, for example 10, is allocated if the freshness of the results is calculated based on the minutes field, a medium number of the second points, for example 7, is allocated if the freshness of the results is calculated based on the hours field, and/or a minimum number of the second points, for example 4, is allocated if the freshness of the results is calculated based on the days field. The allocated second points are summed to obtain a total number of second points.

At operation 435, third points are if the given result page for given keyword includes a Top Stories content, as shown for example on box 176 of the SERP 150 (FIG. 2a).

Then at operation 440, the server adds the first points, the second points and the third points to calculate the score. A maximum of points that may be allocated for the given search query is 41, this result being obtained when the News tab is first on the row 106, when the days, hours and minutes fields are all populated, and when a box 176 shows a Top Stories for the given query. A score of zero (0) may be obtained when the result page for a keyword shows no prevalent news content and no other current information.

In the example of FIGS. 1a and 1b, the News tab is the first tab on row 106 (after the All tab) so the number of the first points is 10. The days field is populated so the number four (4) is allocated to the second points; no further second point is allocated because there is no data in the hours and minutes fields. There is no Top Stories entry in the SERP 100 so the number of the third points is zero (0). The total score for the search query 'ovh' is thus 14 out of a maximum possible score of 41.

In the example of FIGS. 2a and 2b, the News tab is the second tab on row 106 (after the All tab) so the number of the first points is 5. The days field is populated so the number 4 is allocated to the second points. The hours field is populated so 7 is added to the second points. The minutes filed is populated so 10 is added to the second points, for a total of 21 second points. There is a Top Stories entry in the box 176 so the number of the third points is 10. The total score for the search query 'paris' is thus 36 out of a maximum possible score of 41.

The server 210 may cause the operator interface 218 to present each of the keywords of the list of keywords in tabular form with their respective scores. Optionally, the scores may be expressed on a different range, for example from 0 to 100%, ranked 1 to 10 or from first to last, or may be presented in any other form. The range from 0 to 100% may for example be obtained using a simple cross-multiplication of the score calculated at operation 440. On Table I, the scores are expressed as a percentage. For the search query 'ovh', 14 points for the score out of a maximum possible score of 41 is equal to 34 percent. For the search query 'paris', 36 points for the score out of a maximum possible score of 41 is equal to 88 percent.

This embodiment of FIG. 5 does not limit the present disclosure. Variants of the present technology that are contemplated include the use of other parameter values extracted from the SERP and listed in Table I for calculating the score for a given keyword and/or the assignment of distinct weights to distinct information element types for calculating the score.

Figure 6:
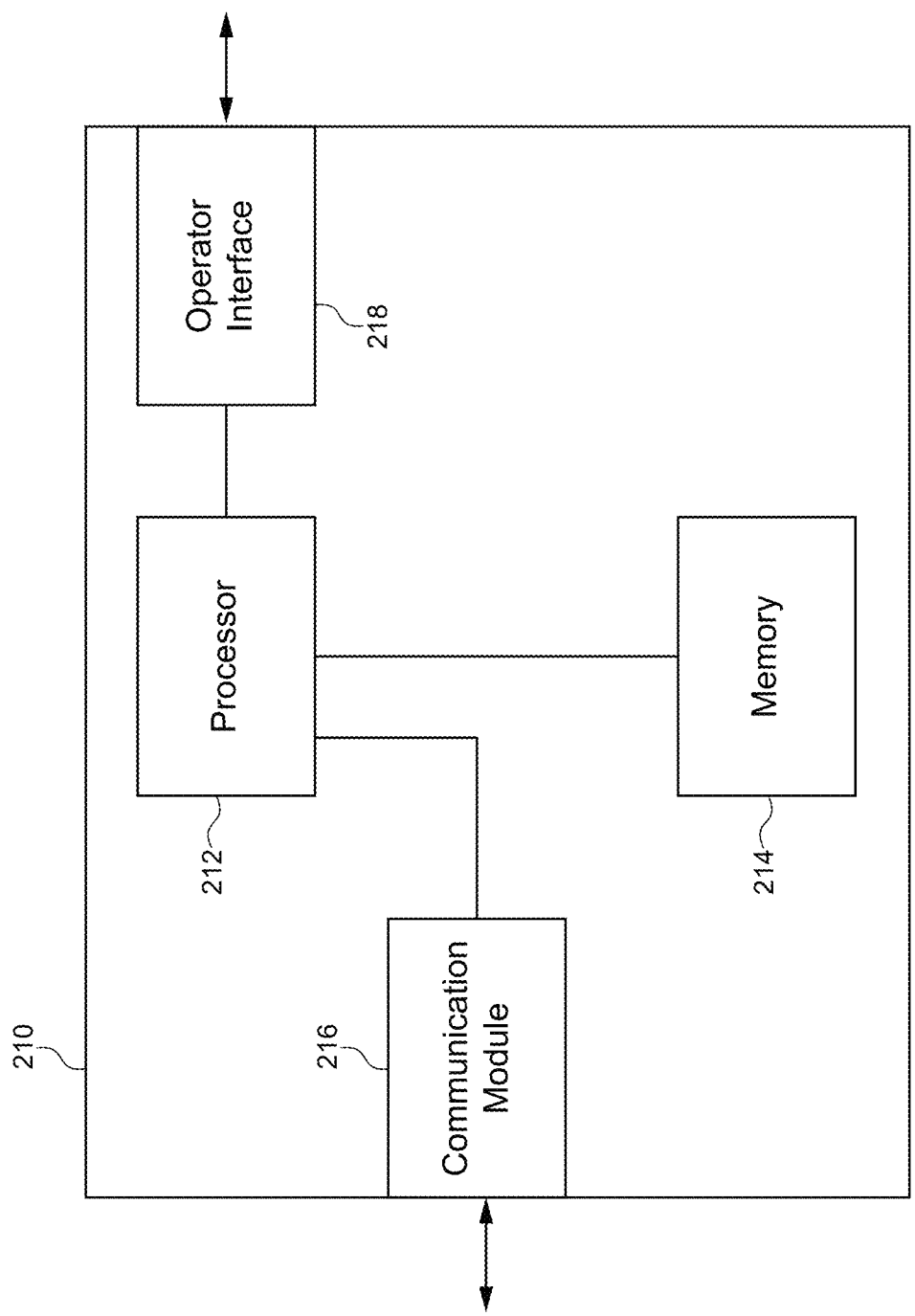
FIG. 6 is a block diagram of a server in accordance with an embodiment of the present technology.

Each of operation of the sequences 300 and 400 may be configured to be processed by one or more processors, the one or more processors being coupled to a memory device. For example, FIG. 6 is a block diagram of the server 210 in accordance with an embodiment of the present technology. The server 210 comprises the operator interface 218 introduced in the foregoing description of FIG. 3, a processor or a plurality of cooperating processors (represented as a processor 214 for simplicity) operatively connected to a memory device or to a plurality of memory devices (represented as a memory device 214 for simplicity) and to a communication module or a plurality of communication modules (represented as a communication module 216 for simplicity). The communication module 216 is configured for communicating, via the Internet 240, with other network nodes such as the search engine 220 and the Internet users 230. In a variant, the communication module 216 may also communicate via the Internet 230 with a remote operator interface, including for example a computer display with a keyboard and a mouse, a touch sensitive display, and the like, for the benefit of the web site owner. The communication module 216 may be realized as distinct output and input modules for respectively sending and receiving messages over the Internet 230. The memory device 214 is configured to store the list of keywords entered by the operator on the operator interface 218 at the request of the processor 212. The memory device 214 may comprise a non-transitory computer-readable medium for storing instructions that are executable by the processor 212.

In the server 210, the processor 212 is configured to receive, via the operator interface 218, a list of keywords relevant to the web page. The processor 212 causes the memory device 214 to store the list of keywords relevant to the web page. The processor 212 also causes the communication module 216 to separately send each keyword of the list of keywords toward the search engine 220 (FIG. 3). The processor 212 receives, from the search engine 220 via the communication module 216, a result page for each keyword of the list of keywords and extracts a plurality of information elements from each result page. The processor 212 may cause the memory device 214 to store the plurality of information elements from each result page, the information being for example stored in tabular form as represented in Table I. For example, the processor 212 may store in the memory device, from the plurality of information elements extracted from a given result page, one or more of a days field, an hours field and/or a minutes field, a plurality of tabs intended for providing access to a corresponding plurality of search result types, and at least a part of a Top Stories content. These examples are non-limiting and the processor 212 may cause the memory device 214 to store any other information elements extracted from each result page, whether these information elements are visible on the result page or part of hidden metadata.

The processor 212 calculates a score for each keyword based on the plurality of information elements extracted from each corresponding result page. Without limitation, the processor 212 may calculate the score for the given keyword based on contents of at least one of the days field, the hours field, the minutes field, the plurality of tabs and the part of the Top Stories content.

The processor 212 then selects at least one most attractive keyword from the list of keywords, the selection being based on at least one best score among the scores for the keywords of the list. The processor 212 causes the operator interface 218 to output the at least one most attractive keyword as a recommendation for updating the web page to include the at least attractive one keyword. In an embodiment, the processor 212 may cause the operator interface 218 to display a representation of the score for each keyword, the representation being one of the score as calculated by the processor 212, a percentage of a possible maximum score, and a rank of each keyword starting from the most attractive keyword. Other equivalent manners of presenting the scores for one or more of the keywords are also part of the present disclosure.

In a variant, the memory device 214 may further comprise a non-transitory computer-readable medium storing executable code thereon. The processor 212 may run instructions contained in the executable code to execute the operations of the sequences 300 and 400.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method for attracting users to a web page, comprising:

defining, at an operator interface of a server, a list of keywords relevant to the web page;

for each keyword of the list of keywords:
  submitting, by the server, the keyword to a search engine,
  receiving, at the server, a result page from the search engine,
  allocating a first amount of points based on an order of a plurality of tabs on the result page,
  allocating a second amount of points based on a freshness of results on the result page, the freshness being determined based on content of one or more of a days field, an hours field, or a minutes field in the result page,
  allocating a third amount of points if the result page includes a top stories content, and
  calculating, at the server, and based on the first amount of points, the second amount of points, and the third amount of points, a score for the keyword;

selecting, at the server, at least one most attractive keyword from the list of keywords, the selection being based on at least one best score among the scores for the keywords of the list; and outputting, on the operator interface of the server, the at least one most attractive keyword as a recommendation for updating the web page to include the at least one most attractive keyword.

2. The method of claim 1, further comprising sorting the keywords according to their respective scores before selecting the at least one most attractive keyword.

3. The method of claim 1, further comprising, for each keyword of the list of keywords, extracting a plurality of information elements from metadata of the given result page.

4. The method of claim 1, wherein the plurality of tabs provide access to a corresponding plurality of search result types.

5. The method of claim 1, wherein calculating the score for each keyword comprises
adding the first amount of points, the second amount of points and the third amount of points.

6. The method of claim 1, wherein allocating the first amount of points comprises:
allocating a maximum number of the first amount of points if a news tab is first in the order of the plurality of tabs; and
allocating less than the maximum number of the first amount of points if the news tab is not first in the order of the plurality of tabs.

7. The method of claim 1, wherein allocating the second amount of points comprises one of more of:
allocating a minimum number of the second amount of points if the freshness of the results is calculated based at least in part on the days field;
allocating a medium number of the second amount of points greater than the minimum number of the second amount of points if the freshness of the results is calculated based at least in part on the hours field; and
allocating a maximum number of the second amount of points greater than the medium number of the second amount of points if the freshness of the results is calculated based at least in part on the minutes field.

8. The method of claim 1, wherein calculating the score for a given keyword of the list of keywords comprises assigning distinct weights to each of the first amount of points, the second amount of points, and the third amount of points.

9. The method of claim 1, further comprising, for each keyword of the list of keywords:
extracting, at the server, a plurality of information elements from the result page; and
determining, based on the plurality of information elements, the order of the plurality of tabs.

10. The method of claim 1, further comprising, for each keyword of the list of keywords:
extracting, at the server, a plurality of information elements from the result page; and
determining, based on the plurality of information elements, the content of the days field, the hours field, or the minutes field.

11. The method of claim 1, further comprising, for each keyword of the list of keywords:
extracting, at the server, a plurality of information elements from the result page; and
determining, based on the plurality of information elements, whether the result page includes the top stories content.

12. A system comprising at least one processor and memory storing a plurality of executable instructions which, when executed by the at least one processor, cause the system to:
receive a list of keywords;
for each keyword of the list of keywords:
submit the keyword to a search engine,
receive a result page from the search engine,
allocate a first amount of points based on an order of a plurality of tabs on the result page,
allocate a second amount of points based on a freshness of results on the result page, the freshness being determined based on content of one or more of a days field, an hours field, or a minutes field in the result page,
allocate a third amount of points if the result page includes a top stories content, and
calculate, based on the first amount of points, the second amount of points, and the third amount of points, a score for the keyword;
select at least one most attractive keyword from the list of keywords, the selection being based on at least one best score among the scores for the keywords of the list; and
output the at least one most attractive keyword as a recommendation for updating a web page to include the at least one most attractive keyword.

13. The system of claim 12, wherein the instructions, when executed by the at least one processor, cause the system to, for each keyword of the list of keywords, extract a plurality of information elements from metadata of the given result page.

14. The system of claim 12, wherein the instructions, when executed by the at least one processor, cause the system to, for each keyword of the list of keywords, add the first amount of points, the second amount of points and the third amount of points to calculate the score for the respective keyword.

15. The system of claim 12, wherein the instructions, when executed by the at least one processor, cause the system to, for each keyword of the list of keywords, assign distinct weights to each of the first amount of points, the second amount of points, and the third amount of points.

16. A non-transitory computer-readable medium having stored thereon computer-executable instructions that, when executed by at least one processor, cause the at least one processor to:
receive a list of keywords;
for each keyword of the list of keywords:
submit the keyword to a search engine,
receive a result page from the search engine,
allocate a first amount of points based on an order of a plurality of tabs on the result page,
allocate a second amount of points based on a freshness of results on the result page, the freshness being determined based on content of one or more of a days field, an hours field, or a minutes field in the result page,
allocate a third amount of points if the result page includes a top stories content, and
calculate, based on the first amount of points, the second amount of points, and the third amount of points, a score for the keyword;
select at least one most attractive keyword from the list of keywords, the selection being based on at least one best score among the scores for the keywords of the list; and
output the at least one most attractive keyword as a recommendation for updating a web page to include the at least one most attractive keyword.

17. The non-transitory computer-readable medium of claim 16, wherein the instructions, when executed by the at least one processor, cause the at least one processor to, for each keyword of the list of keywords, extract a plurality of information elements from metadata of the given result page.

18. The non-transitory computer-readable medium of claim 16, wherein the instructions, when executed by the at least one processor, cause the at least one processor to, for each keyword of the list of keywords, add the first amount of points, the second amount of points and the third amount of points to calculate the score for the respective keyword.

19. The non-transitory computer-readable medium of claim 16, wherein the instructions, when executed by the at least one processor, cause the at least one processor to, for each keyword of the list of keywords, assign distinct weights to each of the first amount of points, the second amount of points, and the third amount of points.

\* \* \* \* \*